(12) United States Patent
Li et al.

(10) Patent No.: US 12,282,202 B2
(45) Date of Patent: Apr. 22, 2025

(54) IMPACT-PROTECTED LENS MODULE WITH BUFFERING PAD AND ELECTRONIC DEVICE

(71) Applicant: TRIPLE WIN TECHNOLOGY(SHENZHEN) CO.LTD., Shenzhen (CN)

(72) Inventors: Kun Li, Guangdong (CN); Shin-Wen Chen, New Taipei (TW); Long-Fei Zhang, Guangdong (CN); Xiao-Mei Ma, Guangdong (CN); Ding-Nan Huang, New Taipei (TW)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 502 days.

(21) Appl. No.: 17/830,511

(22) Filed: Jun. 2, 2022

(65) Prior Publication Data

US 2022/0397738 A1 Dec. 15, 2022

(30) Foreign Application Priority Data

Jun. 11, 2021 (CN) .......................... 202110653408.9

(51) Int. Cl.
*G02B 7/02* (2021.01)
*G02B 13/00* (2006.01)

(52) U.S. Cl.
CPC ............ *G02B 7/026* (2013.01); *G02B 13/001* (2013.01)

(58) Field of Classification Search
CPC .............................. G02B 7/026; G02B 13/001
See application file for complete search history.

(56) References Cited

U.S. PATENT DOCUMENTS

| | | | |
|---|---|---|---|
| 2021/0208418 A1* | 7/2021 | Liu .................... | H04N 23/687 |
| 2021/0364732 A1* | 11/2021 | Kim ...................... | G02B 7/09 |
| 2023/0112239 A1* | 4/2023 | Queeney ................ | H04N 23/54 |
| | | | 348/374 |
| 2023/0247272 A1* | 8/2023 | Han ...................... | H04N 23/55 |
| | | | 348/373 |

FOREIGN PATENT DOCUMENTS

| | | |
|---|---|---|
| CN | 206178319 U | 5/2017 |
| CN | 208110235 U | 11/2018 |
| CN | 211266978 U | 8/2020 |

* cited by examiner

*Primary Examiner* — Charles S Chang
(74) *Attorney, Agent, or Firm* — ScienBiziP, P.C.

(57) ABSTRACT

An impact- and vibration-proof lens module includes a fixing assembly, a circuit board, a lens assembly, and a buffering pad. The fixing assembly defines a chamber, and the circuit board is partially disposed in the chamber. The lens assembly is disposed on the circuit board, and the lens assembly is also partially disposed in the chamber. The buffering pad made of thermally conductive silicon is disposed in the chamber and is disposed between the circuit board and the fixing assembly. In the event of being dropped or suffering vibration, the buffering pad disperses and absorbs stress on the fixing assembly to prevent breakage.

18 Claims, 6 Drawing Sheets

IMPACT-PROTECTED LENS MODULE WITH BUFFERING PAD AND ELECTRONIC DEVICE

FIELD

The subject matter herein generally relates to camera manufacture, and more particularly, to a lens module with a buffering pad and an electronic device includes the lens module.

BACKGROUND

Camera modules may include printed circuit boards (PCBs) and lens holders mounted on the circuit board by a thermosetting adhesive. However, when the electronic device is dropped or suffers vibration, the thermosetting adhesive may detach from the circuit board under the stress. Therefore, there is a room for improvement in the art.

BRIEF DESCRIPTION OF THE DRAWINGS

Implementations of the present technology will now be described, by way of example only, with reference to the attached figures.

DETAILED DESCRIPTION

Figure 1:
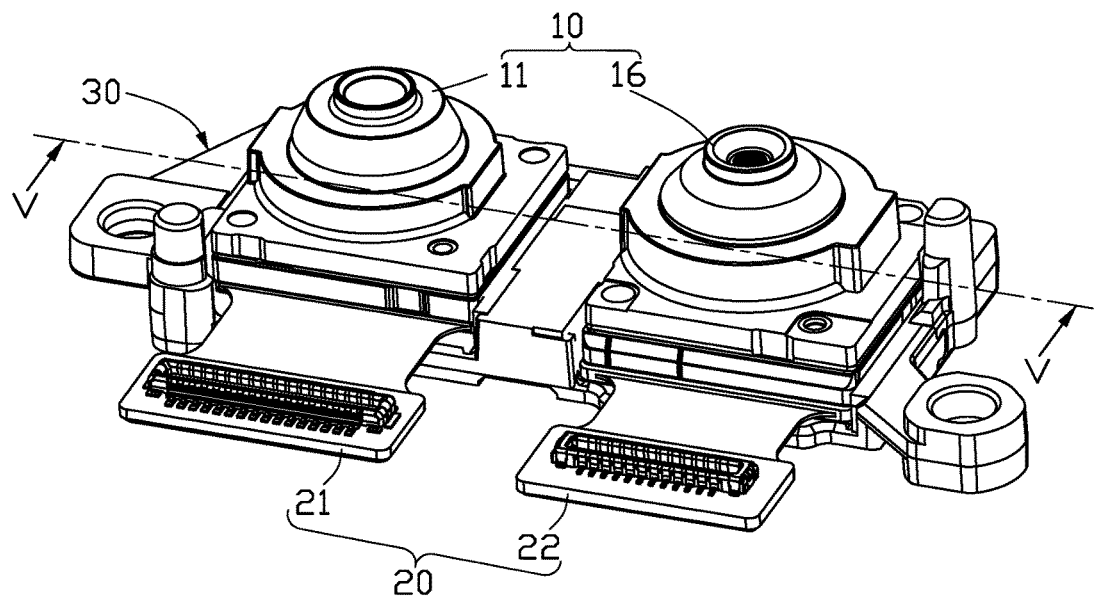
FIG. 1 is a diagrammatic view of an embodiment of a lens module according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Some embodiments of the present disclosure will be described in detail with reference to the drawings. If no conflict, the following embodiments and features in the embodiments can be combined with each other.

Figure 2:
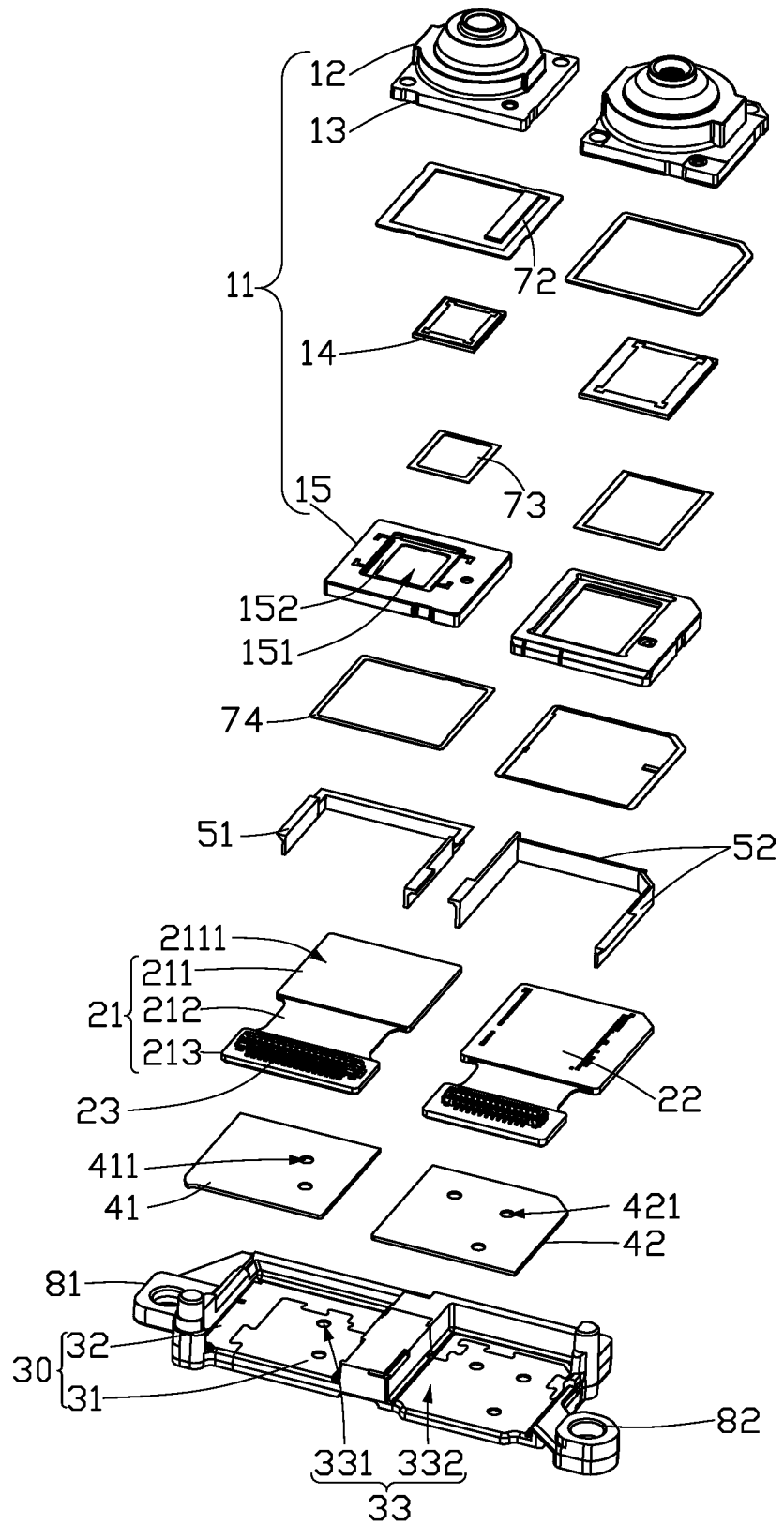
FIG. 2 is an exploded view of the lens module of FIG. 1.
Figure 3:
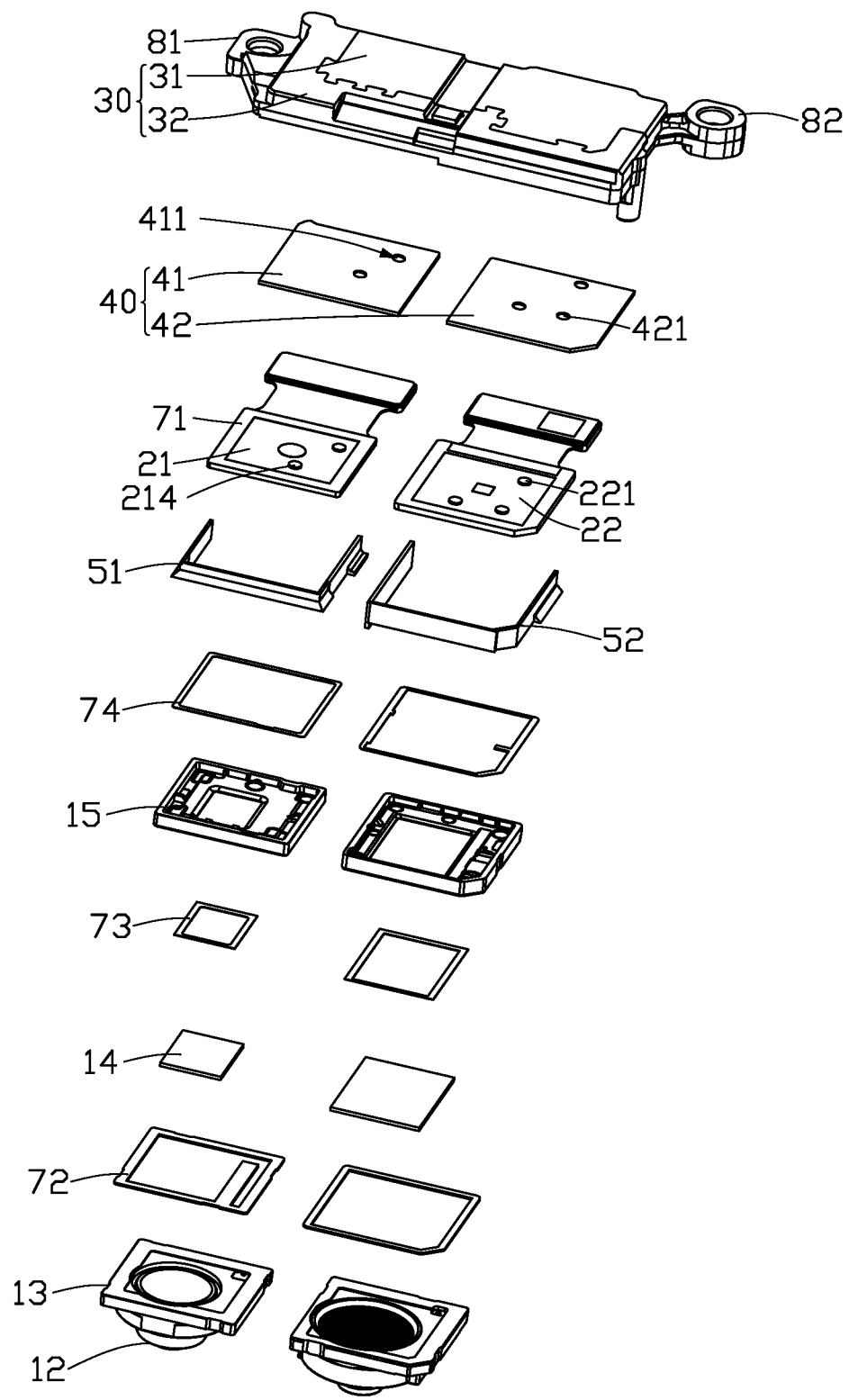
FIG. 3 is similar to FIG. 2, but showing the lens module from another angle.

Referring to FIGS. 1, 2, and 3, a lens module 100 is provided according to an embodiment of the present disclosure. The lens module 100 includes a fixing assembly 30, a circuit board 20, a lens assembly 10, and a buffering pad 40.

The fixing assembly 30 defines a chamber 33, and the circuit board 20 is partially disposed in the chamber 33. The lens assembly 10 is disposed on the circuit board 20, and the lens assembly 10 is also partially disposed in the chamber 33. The buffering pad 40 is disposed in the chamber 33, and is disposed between the circuit board 20 and the fixing assembly 30. The lens assembly 10 and the circuit board 20 are bonded by glue. In some embodiments, the buffering pad 40 can be combined with the fixing assembly 30 by injection molding, and the circuit board 20 and the buffering pad 40 can also be bonded by glue. When the lens module is dropped or suffers vibration, since the buffering pad is disposed between the circuit board 20 and the fixing assembly 30, the buffering pad 40 disperses and absorbs stress suffered by the fixing assembly 30. Damages to the circuit board 20 is avoided, and a stability between the circuit board 20 and the lens assembly 10 is improved. Thus, an imaging quality of the lens module 100 and a greater durability is ensured.

In the embodiment, the lens assembly 10 includes a first lens assembly 11 and a second lens assembly 16. The first lens assembly 11 may be a time of flight (TOF) camera, and the second lens assembly 16 may be a wide-angle lens with high definition. The chamber 33 includes a first chamber 331 and a second chamber 332 adjacent to the first chamber 331. The first lens assembly 11 is disposed in the first chamber 331, and the second lens assembly 16 is disposed in the second chamber 332. The circuit board 20 includes a first circuit board 21 and a second circuit board 22. The buffering pad 40 includes a first buffering pad 41 and a second buffering pad 42. The first circuit board 21 is partially disposed in the first chamber 331. The first buffering pad 41 is disposed between the first circuit board 21 and the fixing assembly 30. The second buffering pad 42 is partially disposed in the second chamber 42. The second buffering pad 42 is disposed between the second circuit board 22 and the fixing assembly 30.

Referring to FIGS. 2, and 3, the first circuit board 21 includes a first board portion 211, a second board portion 212, and a third board portion 213 connected in sequence. The second board portion 212 is disposed between the first board portion 211 and the third board portion 213. In the embodiment, the first lens assembly 11 is mounted on the first board portion 211. The first board portion 211 is disposed inside the first chamber 331. The second board portion 212 and the third board portion 213 are both disposed outside the first chamber 331. A surface of the first circuit board 21 facing the first lens assembly 11 is defined as a base surface 2111. The first circuit board 21 may be a flexible circuit board, a rigid circuit board, or a rigid-flex circuit board. In the embodiment, the first circuit board 21 is a rigid-flex circuit board, the first board portion 211 and the third board portion 213 are both rigid circuit boards, and the second board portion 212 is a flexible circuit board. An electrical connecting portion 23 is mounted on the third board portion 213, and the electrical connecting portion 23 is disposed on the base surface 2111. The electrical connecting portion 23 can be a connector or golden fingers, and the electrical connecting portion 23 enables signal transmission between the lens module 100 and other electronic components in an electronic device 200 (shown in FIG. 6). In the embodiment, a structure of the second circuit board 22 is the same as that of the first circuit board 21.

Figure 4:
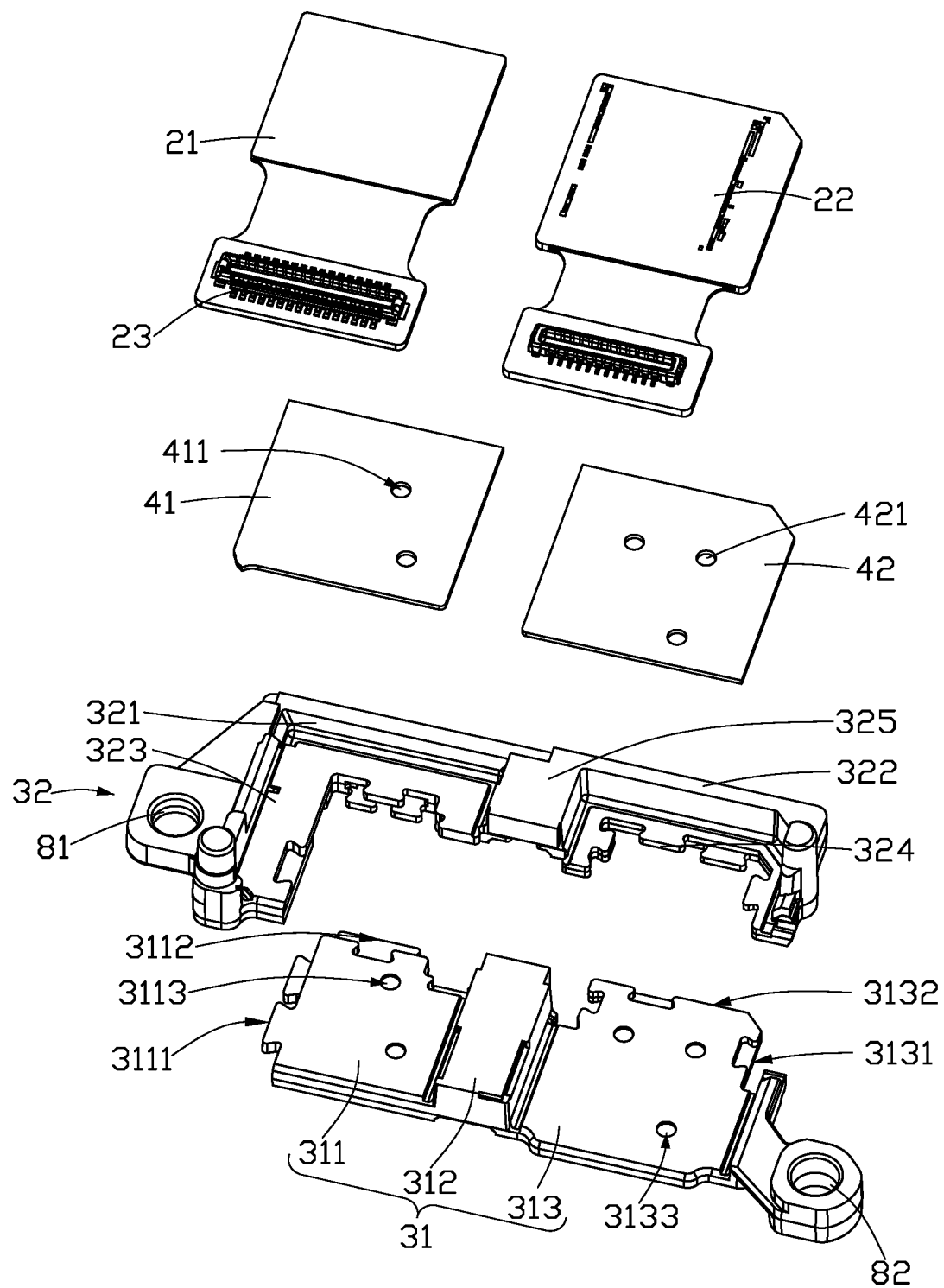
FIG. 4 is an exploded view of a fixing assembly of the lens module of FIG. 1.

Referring to FIGS. 3, and 4, the fixing assembly 30 includes a first fixing member 31 and a second fixing member 32 connected to the first fixing member 31. The first fixing member 31 includes a first bottom plate 311, a first block 312, and a second bottom plate 313. The first block 312 is disposed between the first bottom plate 311 and the second bottom plate 313. In the embodiment, the first bottom plate 311, the first block 312, and the second bottom plate 313 are integrally formed, and are made of metal through a die-casting process. The second fixing member 32 includes a first frame 321, a second frame 322, a first connecting portion 323, a second connecting portion 324, and a second block 325.

The first bottom plate 311 includes a first side surface 3111 away from the first block 312 and a second side surface 3112 adjacent to the first side surface 3111. A side surface of the first frame 321 extends toward the first side surface 3111 and the second side surface 3112 to form the first connecting portion 323. A top surface of the first connecting portion 323 and a top surface of the first bottom plate 311 are on the same plane. The first frame 321 protrudes from the top surface of the first connecting portion 323.

The second bottom plate 313 includes a third side surface 3131 away from the first block 312 and a fourth side surface 3132 adjacent to the third side surface 3131. A side surface of the second frame 322 extends toward the third side surface 3131 and the fourth side surface 3132, to form the second connecting portion 324. A top surface of the second connecting portion 324 and a top surface of the second bottom plate 313 are on the same plane. The second frame 322 protrudes from a top surface of the second connecting portion 324.

The second block 325 is disposed between the first connecting portion 323 and the second connecting portion 324. The second block 325 is connected to the first block 312. The first block 312 and the second block 325 separate the chamber 33 into the first chamber 331 and the second chamber 332. The first bottom plate 311, the first connecting portion 323, the first frame 321, the first block 312, and the second block 325 enclose the first chamber 331. The second bottom plate 313, the second connecting portion 324, the second frame 322, the first block 312, and the second block 325 enclose the second chamber 332. In the embodiment, the second fixing member 32 is integrally formed and made of plastic. The second fixing member 32 is combined with the first fixing member 31 by injection molding.

Referring to FIGS. 3, and 4, a first fixing ring 81 is connected to a side of the first frame 321 away from the first block 312. A second fixing ring 82 is connected to the third side surface 3131 of the second bottom plate 313. The first fixing ring 81 can be integrally formed with the first frame 321, and the second fixing ring 82 can be integrally formed with the second bottom plate 313. In the embodiment, the first fixing ring 81 and the second fixing ring 82 can be fixedly connected to a mainboard (not shown) by using fasteners (such as screws), so as to attach the lens module 100 and the electronic device 200.

Figure 5:
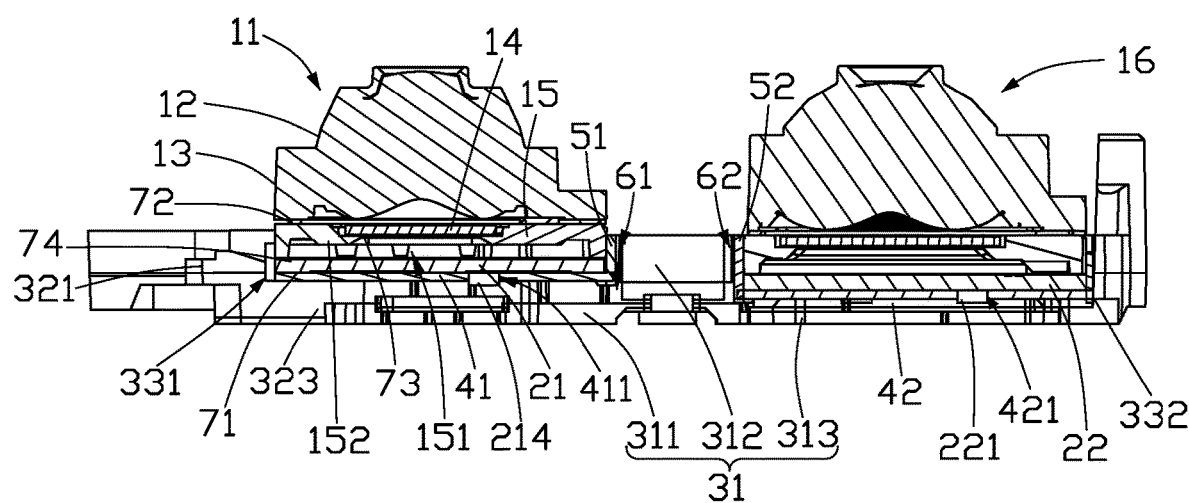
FIG. 5 is a cross-sectional view along line V-V in FIG. 1.

Referring to FIGS. 3, 4, and 5, a first grounding column 214 is disposed on a surface of the first board portion 211 facing away from the base surface 2111. A first mounting groove 3113 corresponding to the first grounding column 214 is defined on a top surface of the first bottom plate 311. The first grounding column 214 and the first mounting groove 3113 provide an electrical connection between the first circuit board 21 and the first bottom plate 311, so as to ground the first circuit board 21. A first through hole 411 is defined in the first buffering pad 41 and penetrates through the first buffering pad 41. The first through hole 411 corresponds to the first installation groove 3113. The first grounding column 214 extends through the first through hole 411, and is disposed in the first mounting groove 3113. Similarly, a second grounding column 221 is disposed on the second circuit board 22. A second mounting groove 3133 corresponding to the second grounding column 221 is disposed on a top surface of the second bottom plate 313. A second through hole 421 is defined in the second buffering pad 42 and corresponds to the second mounting groove 3133.

In the embodiment, the buffering pad 40 is made of thermally conductive silicone. The thermally conductive silicone not only disperses and absorbs the stress suffered by the fixing assembly 30, but also conducts away heat generated by the lens assembly 10 and the circuit board 20, so as to improve the heat dissipation effect of the lens module 100.

In the embodiment, a first glue layer 71 is disposed between the first circuit board 21 and the first buffering pad 41.

Referring to FIGS. 4, and 5, a first gap 61 is defined among the first lens assembly 11, the first circuit board 21, the first block 312, and the second block 325. Specifically, the first gap 61 is disposed among a side surface of the first lens assembly 11, a side surface of the first circuit board 21, a side wall of the first frame 321, the first block 312, and the second block 325. A first glue block 51 infills the first gap 61. The first glue block 51 increases the bonding strength of the first lens assembly 11, the first circuit board 21, and the fixing assembly 30, and improves the stability of the connection between the first lens assembly 11 and the fixing assembly 30. Similarly, a second gap 62 is disposed among the second lens assembly 16, the second circuit board 22, the first block 312, and the second block 325. The second gap 62 is infilled with a second glue block 52.

Referring to FIGS. 2, 3, and 5, the first lens assembly 11 includes a lens 12, a holder 13, a filter 14, and a bracket 15. The lens 12 is disposed in the holder 13. The holder 13 is disposed on the bracket 15. A second glue layer 72 is disposed between the holder 13 and the bracket 15 for fixing the holder 13 and the bracket 15. An opening 151 is defined on the bracket 15 and penetrates the bracket 15. In the embodiment, the bracket 15 is substantially a frame which is square. An inner side wall of the bracket 15 extends toward a central axis of the opening 151 to form a flange 152. The filter 14 is disposed on the flange 152. A third glue layer 73 is disposed between the filter 14 and the flange 152 for fixing the filter 14. A surface of the bracket 15 away from the lens 12 is disposed on the first circuit board 21. A fourth glue layer 74 is disposed between the first circuit board 21 and the bracket 15 for fixing the bracket 15 on the first circuit board 21. In the embodiment, the lens 12 and the holder 13 are integrally formed. The structure of the second lens assembly 16 is the same as that of the first lens assembly 11, and details are not repeated.

Figure 6:
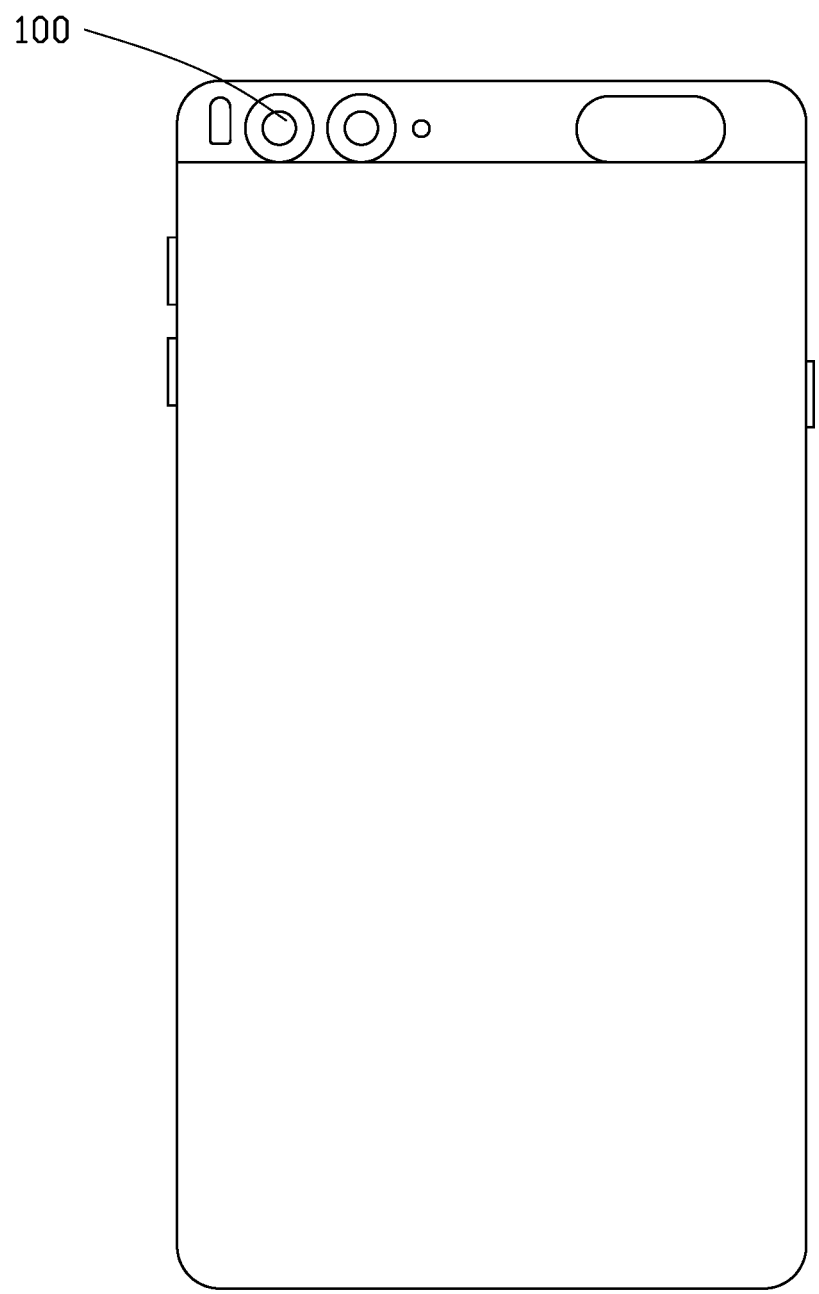
FIG. 6 is a diagrammatic view of an embodiment of an electronic device incorporating the lens module of FIG. 1 according to the present disclosure.

Referring to FIG. 6, an electronic device 200 is provided according to an embodiment of the present disclosure. The lens module 100 can be applied to various electronic devices 200 including a camera module, such as mobile phones, tablets, wearable devices, vehicles, cameras, monitoring devices, transmitters, 3D sensing devices, and the like. In the embodiment, the lens module 100 is applied to a mobile phone.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A lens module comprising:
a fixing assembly defining a chamber;
a circuit board partially disposed in the chamber;
a lens assembly disposed on a surface of the circuit board away from the fixing assembly; and
a buffering pad disposed in the chamber and disposed between the fixing assembly and the circuit board;
wherein the circuit board comprising a grounding column protruding from a surface of the circuit board away from the lens assembly, the fixing assembly further defines a mounting groove, and the grounding column is disposed in the mounting groove.

2. The lens module of claim 1, wherein the buffering pad is made of a thermally conductive silicone.

3. The lens module of claim 1, further comprising a first glue layer disposed between the circuit board and the buffering pad.

4. The lens module of claim 1, wherein the fixing assembly comprises a first fixing member and a second fixing member connected to the first fixing member, the first fixing member is made of metal, and the second fixing member is made of plastic.

5. The lens module of claim 1, wherein a through hole is defined in the buffering pad, the grounding column extends through the through hole and is disposed in the mounting groove.

6. The lens module of claim 1, wherein the first fixing member comprises a block, a gap is defined among the lens assembly, the circuit board, and the block; a glue block infills in the gap.

7. The lens module of claim 1, wherein a first fixing ring and a second fixing ring are disposed on opposite sides of the fixing assembly, and the first fixing ring and the second fixing ring are configured to installing the fixing assembly.

8. The lens module of claim 1, wherein the lens assembly comprises a first lens assembly and a second lens assembly, the chamber comprises a first chamber and a second chamber adjacent to the first chamber, the first lens assembly is disposed in the first chamber, and the second lens assembly is disposed in the second chamber.

9. The lens module of claim 8, wherein the circuit board comprises a first circuit board and a second circuit board, the buffering pad comprises a first buffering pad and a second buffering pad, the first circuit board is partially disposed in the first chamber, the first buffering pad is disposed between the first circuit board and the fixing assembly, the second buffering pad is partially disposed in the second chamber, and the second buffering pad is disposed between the second circuit board and the fixing assembly.

10. An electronic device comprising:
a lens module comprising:
a fixing assembly defining a chamber;
a circuit board partially disposed in the chamber;
a lens assembly disposed on a surface of the circuit board away from the fixing assembly; and
a buffering pad disposed in the chamber and disposed between the fixing assembly and the circuit board;
wherein the circuit board comprising a grounding column protruding from a surface of the circuit board away from the lens assembly, the fixing assembly further defines a mounting groove, and the grounding column is disposed in the mounting groove.

11. The lens module of claim 10, wherein the buffering pad is made of a thermally conductive silicone.

12. The lens module of claim 10, further comprising a first glue layer disposed between the circuit board and the buffering pad.

13. The lens module of claim 10, wherein the fixing assembly comprises a first fixing member and a second fixing member connected to the first fixing member, the first fixing member is made of metal, and the second fixing member is made of plastic.

14. The lens module of claim 10, wherein a through hole is defined in the buffering pad, the grounding column extends through the through hole and is disposed in the mounting groove.

15. The lens module of claim 10, wherein the first fixing member comprises a block, a gap is defined among the lens assembly, the circuit board, and the block; a glue block infills in the first gap.

16. The lens module of claim 10, wherein a first fixing ring and a second fixing ring are disposed on opposite sides of the fixing assembly, and the first fixing ring and the second fixing ring are configured to installing the fixing assembly.

17. The lens module of claim 10, wherein the lens assembly comprises a first lens assembly and a second lens assembly, the chamber comprises a first chamber and a second chamber adjacent to the first chamber, the first lens assembly is disposed in the first chamber, and the second lens assembly is disposed in the second chamber.

18. The lens module of claim 17, wherein the circuit board comprises a first circuit board and a second circuit board, the buffering pad comprises a first buffering pad and a second buffering pad, the first circuit board is partially disposed in the first chamber, the first buffering pad is disposed between the first circuit board and the fixing assembly, the second buffering pad is partially disposed in the second chamber, and the second buffering pad is disposed between the second circuit board and the fixing assembly.

* * * * *